United States Patent Office

3,488,831
Patented Jan. 13, 1970

3,488,831
FLUXING MATERIALS FOR SOLDERING METAL SURFACES
Abraham Ravve, Chicago, Ill., assignor to Continental Can Company, Inc., New York, N.Y., a corporation of New York
No Drawing. Original application Apr. 22, 1964, Ser. No. 361,889. Divided and this application Apr. 14, 1967, Ser. No. 647,265
Int. Cl. B23k 31/02
U.S. Cl. 29—495         5 Claims

ABSTRACT OF THE DISCLOSURE

A method of making a connection between a high lead and low tin alloy solder and a solderable metal surface which comprises heating the alloy solder to a molten temperature and applying the molten solder together with a salt of a tertiary amine, such as triethylamine, and a polycarboxylic acid, such as sebacic, to a portion of the solderable metal surface heated to a temperature between 650° and 750° C., and thereafter, cooling the connection formed to a temperature less than 650° F.

---

This is a division of application Ser. No. 361,889, filed Apr. 22, 1964, now abandoned.

This invention relates to fluxing materials for the soldering of metal surfaces with conventional metal solders. More specifically, the invention relates to the use of tertiary amine salts of polycarboxylic acids for use as fluxing materials on ferrous metal surfaces and tinplate surfaces. The tertiary amine components of the salt include aliphatic tertiary amines and cyclic amines having a tertiary nitrogen atom in the ring.

The fluxing materials of this invention are usable with any of the commonly used ferrous metal or iron surface solders, such as soft solders composed of lead-tin alloys constituted of a major portion of lead, and brazing solders composed of copper-zinc alloys. Such solders are normally employed for constructions in which ferrous metals are employed. Blackplate and tinplate are used extensively in the manufacture of metal containers, particularly food containers, and as such are normally fabricated by use of solders of the soft solder type. In the quantity production employment of such solders upon the thin blackplate or tinplate, the fluxing material for the solder becomes critical. The solder must flow rapidly and freely onto and into the metal joint to be bonded during fabrication. The marginal angle of a sessile drop of solder, which indicates the metal wetting qualities of the solder, should be low in order to provide for the rapid flow-out of the solder and adequate metal-solder contact.

Most satisfactory fluxing materials appear to perform three functions. The first is to free the metal surfaces of organic materials such as oils and greases and inorganic dirt which is associated therewith. This "cleaning" of the metal surface of such materials can be accomplished by many of the known fluxing materials. The second function performed is that the fluxing material should remove metal oxides from the metal surfaces, for which a moderate to a strong acidic character is desirable. However, strong acids in organic solvents have corrosive effects on the metal surfaces, which effects are particularly acute when the metal surfaces have been subjected to strains and tensions during previous fabrication steps, such as those in the production of metal food containers. The third function which the soldering material should perform is to cause the solder to better wet the metal surface when employed with the fluxing material. That is, the marginal angle of a sessile drop of solder used with the fluxing material should be lower than the solder used alone upon the metal.

Various fluxing materials have been proposed in order to meet these functional criteria for various metals and solder systems. An old practice is with ammonium chloride which is said to break down upon heating with the solder so that free hydrochloric acid is given off to attack the metal surface oxide and provide clean metal for the solder. The ammonia given off in the heat decomposition reaction makes such a fluxing material particularly undesirable for continuous use.

It has been suggested to use primary, secondary and tertiary hydroxyl-alkyl-amines for fluxing material. These have also been used along with organic acids in order to attain the benefits of the fluxing properties of both materials.

Both abietic acid and glutamic acid have been used with amines such as diethylene-triamine, dibutylamine, diamylamine, hexamethylenetetramine and the triethanolamine mentioned above. Abietic acid is mono-carboxylic and is of condensed aromatic ring structure. Glutamic acid is substituted with an amino group, and its use is consistent with its probable compatibility with such amines. Free acids have also been used either alone or with a volatile solvent for cleaning metal surfaces so that a clean surface is present for contact with the solder, but the effective acids for fluxing require expensive solvents if they are to be employed.

These fluxing materials of the prior art are limited in their ability to adequately satisfy all or at least one of the functions of a good flux, set out above. Generally, those compositions containing uncombined acid at room temperature, when heated to soldering temperatures, adversely corrode the metal surface to be soldered. The important function of causing the solder to better wet the metal surface is not adequately satisfied by the prior art.

By the fluxing materials of the present invention, simple solvents may be used to provide desired viscosities and therewith avoid the necessity of continuous heating which is required with some other fluxing materials. The fluxing materials of the present invention do not require the presence of solvents for use, but are soluble in common solvents such as aromatics and ketones. Such solvents are low in cost and may be volatilized from the soldering site without the expensive solvent collection systems which are required when the more toxic and expensive solvents, such as dimethylformamide, are employed, as required for other fluxing materials.

Briefly, the tertiary amine salts of polycarboxylic acids and the related salts of this invention have the following formulas:

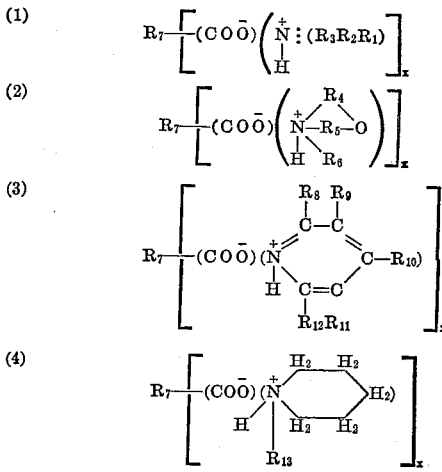

where $R_1$ and $R_2$ are alkyl groups having from 1 to 6 carbon atoms, $R_3$ is an alkyl group having from 1 to 6 carbon atoms or an aryl group such as phenyl, tolyl or xylyl, $R_4$ and $R_5$ are divalent ethyl groups, $R_6$ in an alkyl group having from 1 to 6 carbon atoms in straight or branched chain, $R_7$ is a multivalent alkyl group having from 4 to 8 carbon atoms either in a straight chain or in a branched chain or is a multi-valent aryl group, $R_8$, $R_9$, and $R_{10}$ are hydrogen, or alkyl groups of from 1 to 6 carbon atoms with the total of the pendant groups being 6 carbons or below, $R_{11}$ and $R_{12}$ are hydrogen or methyl groups, $R_{13}$ is an alkyl group of from 1 to 4 carbon atoms, and $x$ is an integer of 2 or 3.

These salts may be used alone or taken up as solutes in simple and inexpensive volatile inert organic solvents and applied before or during the contacting of the metal surface with the solder.

The tertiary amine salts of polycarboxylic acids and their related salts avoid the strong corrosive effects of free acids upon steel and tinplate while giving the necessary metal oxide removing acidic capability upon being heated to the soldering temperature. The fluxing material of the present invention also enables the solder to wet the metal surfaces more thoroughly due to the decrease in the marginal angle of a sessile drop of solder to below the angle resulting from the use of presently used flux materials with the same solder-metal system. Specifically, the marginal angle of a sessile drop of lead-tin solder is smaller by the use of the fluxing salts of the present invention than: The angle attainable by the use of di-triethanolamine sebacate, di-diethylamine sebacate, or di-monoethylamine sebacate; all compared in a standardizing solvent.

The actions of the fluxing materials of the present invention are believed partially due to the decomposition of the tertiary amine salt with liberation of the free polycarboxylic acid upon the metal surface. Such decomposition occurs at the temperatures at which metal solder is used.

It is, therefore, an object of this invention to provide a soldering flux of the salt of a tertiary amine and polycarboxylic acid in which the amine is selected from the group of amines in which the nitrogen atoms is joined to three coupled carbon atoms and said polycarboxylic acid has a formula of:

(5)
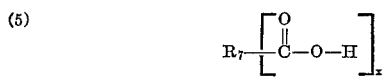

where $R_7$ is selected from the class consisting of an alkyl group having from 4 to 8 carbon atoms and an aryl group, and $x$ is an integer of 2 or 3. The salt is formed by the combination of said amine and said polycarboxylic acid in the mole ratio of $x$ to 1, respectively.

Another object of this invention is to provide a method of making a soldering flux by dissolving in a volatile inert organic solvent the salt of a tertiary amine and a polycarboxylic acid having the formula of:

(6)

where $R_7$ is selected from the class consisting of an alkyl group having from 4 to 8 carbon atoms and an aryl group, and $x$ is an integer of 2 or 3, and said salt resulting from the combination of said tertiary amine and said polycarboxylic acid in the mole ratio of $x$ to 1, respectively. This object may be attained by first forming the salt in the absence of a volatile organic solvent and thereafter dissolving said salt in an inert volatile organic solvent to attain desired viscosity or by adding the tertiary amine to the inert organic solvent and then adding the polycarboxylic acid to form said salt which is simultaneously dissolved.

Yet another object of the present invention is to provide a method of making a connection between a high lead and low tin alloy solder and a solderable metal surface by the steps of: forming the salt of a tertiary amine and a polycarboxylic acid, as defined above, by the combination of said amine and said polycarboxylic acid in the mole ratio of $x$ to 1, dissolving said salt in an inert volatile organic solvent, heating said alloy solder to a molten temperature, heating a portion of said metal surface to between 650° to 750° F., applying the solution of said salt in volatile organic solvent and said solder to the heated portion of said metal surface, and cooling the connection formed to a temperature less than 650° F.

Yet another object of the present invention is to provide a preferred solder flux which consists of, in a volatile inert organic solvent of butyl acetate and ethylene glycolmonomethyl ether, the dicarboxylic salt of triethylamine and sebacic acid.

A further object of the present invention is to provide solder flux compositions which consist of the above tertiary amine salts of polycarboxylic acids dissolved in a volatile inert organic solvent. Generally, the weight percentage of salt in the solvent is between 30 to 50 percent.

These and other objects will be better understood by reference to the following description and claimed subject matter.

The salts set out in the brief description are formed from a tertiary amine having the generic formula of:

(7)

where $Y_1$ and $Y_2$ are selected from the class of a single hydrocarbon group (Y) and separate hydrocarbon groups; when a single group Y is cyclized with Z to form a 6-membered heterocyclic aromatic ring containing the trivalent nitrogen atom wherein Y and Z are hydrocarbon groups with Y having from 3 to 9 carbon atoms and Z having from 2 to 4 carbon atoms, and wherein groups pendant from the heterocyclic ring are alkyl radicals; and when $Y_1$ and $Y_2$ are separate, both are alkyl groups of from 1 to 6 carbon atoms wherein Z is selected from the class of an alkyl group of from 1 to 6 carbon atoms, and an aryl group of from 6 to 8 carbon atoms, and wherein when $Y_1$ and $Y_2$ are ethyl groups, they may be cyclized through an oxygen atom or a methylene group with Z being, respectively, an alkyl group of from 1 to 6 carbon atoms and an alkyl group of from 1 to 4 carbon atoms, and a polycarboxylic acid having the formula of:

(8)
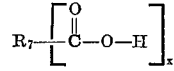

where $R_7$ is an alkyl group having from 4 to 8 carbon atoms either in straight or branch chain configuration or an aryl group, and $x$ is an integer of 2 or 3.

The acid component is then di- or tri-carboxylic and the tertiary amine is employed in an amount great enough to form the di- or tri-carboxylic salts, respectively. That is, each carboxyl group in each molecule of the acid is combined with one molecule of the tertiary amine under ideal conditions of mixing.

The number of carboxyl groups is then useful in determining the mole ratio of the amine to the acid in order to exactly form the desired salt. The reaction equation is:

(9)
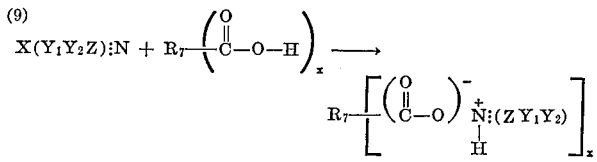

The components ratio of amine to acids is $x$ to 1 where $x$ is the number of carboxyl groups on the acid molecule. For the reaction to form the di- or tri-carboxylic salts of this invention, $x$ is 2 or 3, respectively.

The formation of the salt may be in a solvent-free atmosphere for producing the final composition or the formation of the salt may be in a mass of volatile inert organic solvent.

The following examples illustrate practices of this invention and demonstrate operative conditions, but are not intended to be limitative. Parts are by weight, unless otherwise specified.

EXAMPLE I

| Components: | Parts, grams |
|---|---|
| Triethylamine | 101 |
| Xylene | 202 |
| Sebacic acid | 101 |

A solution of the triethylamine was made by adding the same to xylene, a volatile inert organic solvent, at room temperature. The sebacic acid was then added to produce a clear solution. No heating was required. The salt formed was di-triethylamine sebacate.

This solution, when tested, as a flux, compares favorably in fluxing power with conventional fluxes prepared from an expensive dimethylformamide solution of free sebacic acid fortified with stannous chloride and monoethanolamine hydrochloride. However, this fluxing solution does not contain compounds which are toxic and corrosive to the metal surfaces being soldered, as is the dimethylformamide of the above conventional flux.

While the theory or theories underlying the efficacy of the fluxing materials of this invention have not been completely developed, a probable explanation is that the salts of the organic acids decompose under the action of the soldering heat to liberate the free acid and tertiary amines to carry out the surface contaminant removal, the metal oxide removal from the metal surface, and the co-wetting of the metal base and the solder to carry out the fluxing effect.

A distinct advantage of the employment of the fluxing material of the present invention in high speed low profit food container fabrication is that the usable solvents, when employed, are inexpensive enough to eliminate the need for recovery procedures. The flux mixture does not require heating prior to and during flow-out onto the metal surface with the solder. These advantages, together with the improved metal wetting ability of the solder when used with these fluxing materials, distinguish them from known fluxing materials.

EXAMPLE II

| Components: | Parts, grams |
|---|---|
| Triethylamine | 202 |
| Sebacic acid | 202 |
| Xylene | 404 |

The dicarboxylic salt of triethylamine and sebacic acid was first formed, in the absence of a solvent, by mixing the two components at room temperature in a suitable vessel. The salt which was a clear liquid was formed in a short time with mixing. The reaction accelerated by heating the components to 150–200° F., at which temperature the reaction was complete in several minutes.

The salt thus formed was then added to the xylene to produce a final flux composition having a low viscosity. The salt alone functions as a good flux composition but is not of sufficiently low viscosity, at room tempeartures, for high production rate employment. A preferred viscosity is present over the range of from 30 to 50 weight percent salt based on the total weight.

This example of practice differs from Example I in that no solvent was present during the salt formation, thus demonstrating that the decreased concentration of molecules per unit volume in the reaction mass of that practice was not required. In that prior example of practice, the salt was formed within the solvent, which then immediately dissolved the salt produced. Thus, the formation and dissolution steps were simultaneous. In the present example, the formation and dissolution are separate steps of the maanufacturing process.

The dicarboxylic salt may be dissolved into a suitable solvent and the resulting solution employed at ambient temperature as a fluxing composition or may be employed without a solvent. The formation and/or use of these tertiary amine salts in the absence of a solvent is possible due to the fact that they are liquids at room temperature and present a distinct advantage over the prior art. The free acid fluxes of the solder art require expensive solvents and other fluxing substances all require solvents which make solvent recovery and/or collecting mandatory for volume usages.

The fluxing salts may be preferably prepared by adding one part of the amine to two parts of a volatile inert organic solvent and then adding the polycarboxylic acid to form said salt which is, in turn, dissolved simultaneously. Yet another preparation is to mix the amine with said polycarboxylic acid in the absence of a solvent and thereafter dissolved into a volatile inert organic solvent.

In both Examples I and II the mole ratio of triethylamine to sebacic acid was 2 to 1, respectively. This ratio is then representative of the number of carboxyl groups in the sebacic acid molecule.

EXAMPLE III

| Components: | Parts, grams |
|---|---|
| Triethylamine | 303.6 |
| Xylene | 515 |
| Trimellitic acid | 210.1 |

The triethylamine is added to the xylene at room temperature to form a solution. The trimellitic acid is then added to produce a clear solution, no extended heating being needed. The salt formed is tri-triethylamine trimellitate, or the tri-carboxylic triethylamine salt of 1, 2, 4 benzenetricarboxylic acid.

The mole ratio of amine to acid in this practice is 3 to 1. The acid is tricarboxylic, thus exhibiting an $x$ value of 3. The reaction equation is:

(10)

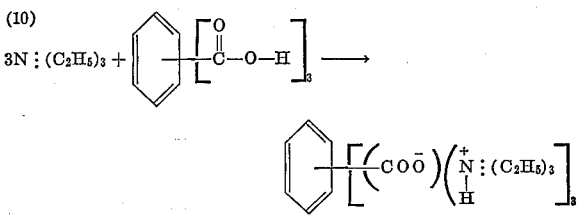

EXAMPLE IV

| Components: | Parts, grams |
|---|---|
| N-methyl morpholine | 101 |
| Xylene | 201 |
| Sebacic acid | 101 |

A solution of the N-methyl morpholine is made by adding it to the xylene. The fluxing salt is formed by the reaction occurring upon addition of the acid, the salt being simultaneously dissolved to form a clear solution in the solvent.

The mole ratio of the tertiary amine to the acid is the same as in Example I. The morpholine acts in the same manner as the other tertiary amines in forming a salt which is liquid at rooms temperature and is soluble in simple, inexpensive solvents and which, when dissolved, has superior fluxing properties. The reason for the similar action being due to the functional relationship between the tertiary amine and the morpholine, both having a trivalent nitrogen atom and the —O— of the morpholine being inert in the salt formation reaction and in subsequent fluxing.

EXAMPLE V

A series of experiments were carried out to determine the fluxing properties of the following compounds: (1) ditriethylamine sebacate, (2) sebacic acid, (3) di-triethanolamine sebacate, (4) di-diethylamine sebacate, and (5) di-monoethylamine sebacate.

Four samples of each of the listed compounds were prepared in the manner described in Example I above, and then extracted from the xylene. Testing was then conducted with dimethyl formamide used as a solvent, to facilitate comparison. This strong solvent was needed to form a solution with the sebacic acid.

The measurements made were of the marginal angles of sessile drops of a standard lead-tin solder when wetted by the test fluxing compositions. By measurement of the marginal angles, the spreading of the solder drops with respect to a heated solderable metal surface may be determined. A greater spreading indicates a greater adhesion for the metal surface and therewith the formation of a connection which, when cooled, can create a stronger solder joint. Good spreading is also of importance with respect to the speed at which continuous solder joints may be formed. In addition, the performance of the fluxing compositions in forming a satisfactory or unsatisfactory solder joint was determined on a conventional qualitative basis. This additional performance determination is important for checking the cleaning of the metal surfaces. If the fluxing composition does not remove the metal oxides and surface contaminants, then the greatest solder spreading attainable is ineffective to form a good connection.

The marginal angles of the sessile drops of solder formed on a plate held at 650°–750° F. with a flux of a dimethyl formamide solution of each of the compounds 1–5 were measured after cooling and the results recorded in Table I. The connection-performance determination was evaluated as Sat. for satisfactory and Unsat. for unsatisfactory and recorded in Table I.

propyl morpholine, N-butyl morpholine, N-isobutyl morpholine, N-amyl morpholine and N-hexyl morpholine or N-alkyl piperidines, for example, N-methyl piperidine, N-ethyl piperidine, N-propyl piperidine, N-isopropylpiperidine, N-butyl piperidine, and N-isobutylpiperidine; and pyridine together with the homologs thereof such as 2-methylpyridine (alpha-picoline), 3-methylpyridine (beta-picoline), 4-methyl pyridine (gamma-picoline), 2-ethyl pyridine, 3-ethyl pyridine, and 4-ethyl pyridine. The pyridine homologs which may additionally be used for the tertiary amine have a general formula for substituent group numbering of:

(11)

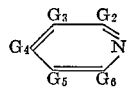

where $G_{2-6}$ are the substituent groups and are hydrogen for simple pyridine and are selectively substituted by alkyl groups in the homologs thereof. Specific examples of mono-alkyl pyridines, including the above listing, have the following substituted groups: for $G_{2-5}$, methyl, ethyl, propyl, isopropyl, butyl, isobutyl, amyl, hexyl and isomeric forms thereof. Examples of di-alkyl pyridines which may be employed are the various isomeric forms of lutidine (di-methyl pyridine) which can have any two positions in Formula 11 occupied by methyl groups, the various isomeric forms of diethyl pyridines, and homologs thereof. Tri-alkyl pyridines may be employed; exemplary thereof are sym-collidine (2,4,6-trimethyl pyridine), unsym-col-

TABLE I

| Composition No. | Flux compound | Marginal angle trial | | | | Performance |
|---|---|---|---|---|---|---|
| | | 1 | 2 | 3 | 4 | |
| 1 | Di-triethylamine sebacate | 6° 45′ | 7° | 6° 30′ | 7° | Sat. |
| 2 | Sebacic acid | 7° | 7° 15′ | 6° 30′ | 7° 30′ | Sat. |
| 3 | Di-triethanolamine sebacate. | 14° 15′ | 13° 30′ | 14° 30′ | 16° | Unsat. |
| 4 | Di-diethylamine sebacate | (*) | (*) | (*) | (*) | Unsat. |
| 5 | Di-monoethylamine sebacate. | (*) | (*) | (*) | (*) | Unsat. |

*No solder spreading by presence of flux.

Table I shows fluxes (1) and (2) as performing satisfactorily and increasing the adhesion of the solder to the metal plate. Flux (2) necessitates use of dimethyl formamide as a solvent. Flux (1) is highly soluble in a variety of inexpensive and non-toxic solvents, and thus is, practically, the most desirable fluxing composition. Use of flux compound (1) in such inexpensive solvents obtains like fluxing properties, and, therefore, the test results of Table I show the comparative fluxing properties of the compounds, per se.

Compositions (3–5), having unsatisfactory performance, do not sufficiently wet the metal plate to be of value as fluxing materials. In composition (3) the presence of the hydroxyl group in the amine is thought to reduce the basicity of the amine ion below the acceptable value.

By further testing it has been found that tertiary amine salts of monocarboxylic acids are not effective as fluxing materials. This effect is probably due to the lower reactivity of the monocarboxylic acid, after the salt has been decomposed by heat, with the oxides on the surface of the metal.

The general conclusion emerging from the testing conducted is that only salts of polycarboxylic acids with tertiary amines of the type defined give the excellent fluxing properties.

Tertiary amines which may be used for making-up the flux salts according to the present invention are: alkyl amines such as triethylamine, dimethylaniline, diethylaniline, trimethylamine, triamylamine, trihexylamine, and homologs thereof; saturated heterocyclic tertiary amine such as N-alkyl morpholines, for example, N-methyl morpholine, N-ethyl morpholine, N-propyl morpholine, N-isolidine (2,4,5-trimethyl pyridine), and homologs thereof. Tetra-alkyl pyridines such as parvuline (tetramethyl) can also be employed.

The above listing shows that tertiary amines having a formula as defined by Formula 7, above, may be used, together with the polycarboxylic acids here defined to produce the novel amine salts set out by Formulas 1–4, above. When a pyridine as defined by Formula 11 is used for the tertiary amine, a salt of the Formula 3 type is produced which has similar fluxing properties to all of the other salts here disclosed. In general, the tertiary amines listed above have approximately the same reactivity to the defined polycarboxylic acids as does the preferred triethylamine and, hence, furnish similar fluxing properties.

The listing of the tertiary amines shows that the useful compounds are those containing a trivalent nitrogen atom coupled to three carbon atoms in which the groups containing the carbon atoms are hydrocarbon groups, with the permissible presence of a cyclic oxygen atom in a heterocyclic ring as in N-alkyl morpholine. Formula 7 defines this tertiary amine grouping for purposes of description and claiming.

Generally, the tertiary amine salts having the structural formula of (1), above, are preferred due to their relatively low cost and ease of handling. For food container soldering, the fluxing materials must not have objectionable residues after the soldered seam has been made. The trialkyl amine salts have little or no objectionable residues which would limit their use in food container manufacturing. Pyridine, by comparison, has a pungent odor which is carried over to the flux residues after solder, thus restricting its use for the tertiary amine of the present invention. Of the preferred amine group, triethylamine has been found the most desirable on a commercial basis.

When used with dicarboxylic acids, such as sebacic, the solutions of the salts vary in color from a straw color with triethylamine to reddish-purple with N-methyl morpholine.

The preferred acids for formation of the fluxing salts are sebacic and isosebacic acids. The latter of these acids is a name for 2-ethylsuberic acid and for 2,5-diethyladipic acid or a mixture thereof. Isosebacic acid sold commercially contains predominate amounts of these two acids. All aliphatic saturated dicarboxylic acids having 6 to 10 carbon atoms in straight or branch chains may be employed. Aromatic di- or tri-carboxylic acids are also a preferred group. An exemplary list of the usable acids is: adipic, pimelic, suberic, azelaic, sebacic, terephthalic, isophthalic and trimellitic acids.

Any of the following solvents or mixtures thereof may be employed to form a solution with the salts: benzene, toluene, xylene, nitropropane, butyl acetate, isopropyl alcohol, "methyl cellosolve" (ethylene glycol monomethyl ether), "ethyl cellosolve" (ethylene glycol monoethyl ether), "butyl cellosolve" (ethylene glycol monobutyl ether), methyl-ethyl-ketone, methyl-isobutyl-ketone and isophorone. A preferred solvent is a one to one weight mixture of butyl acetate and "methyl cellosolve."

Both alkane solvents and chlorinated solvents have been found to be unusable with the novel amine salts of the present invention.

Generally, sufficient solvent is employed to give a solution containing 30 to 50 weight percent salt at which concentration a preferred viscosity range is established.

Mixtures of various fluxing compounds of the present invention can be employed. Also, mole ratios of amine to the acid greater than stoichiometric amounts (based on the number of carboxylic groups) can be used, although no increase in fluxing properties is attained thereby. The various tertiary amines and polycarboxylic acids can be mixed in order to produce mixed fluxing salts.

It is obvious that the illustrative practices are not restrictive; and that the invention can be practiced in many ways within the scope of the appended claimed subject matter.

I claim:

1. The method of making a connection between a high lead and low tin alloy solder and a solderable metal surface which comprises forming the salt of a tertiary amine and a polycarboxylic acid, the tertiary amine having the formula of:

where $Y_1$ and $Y_2$ are selected from the class of a single hydrocarbon group (Y) and separate hydrocarbon groups; when a single group Y is cyclized with Z to form a 6-membered heterocyclic aromatic ring containing the trivalent nitrogen atom wherein Y and Z are hydrocarbon groups with Y having from 3 to 9 carbon atoms and Z having from 2 to 4 carbon atoms, and wherein groups pendant from the heterocyclic ring are alkyl radicals; and when $Y_1$ and $Y_2$ are separate, both are alkyl groups of from 1 to 6 carbon atoms wherein Z is selected from the class of an alkyl group of from 1 to 6 carbon atoms, and an aryl group of from 6 to 8 carbon atoms, and wherein when $Y_1$ and $Y_2$ are ethyl groups, they may be cyclized through an oxygen atom or a methylene group with Z being, respectively, an alkyl group of from 1 to 6 carbon atoms and an alkyl group of from 1 to 4 carbon atoms, and said polycarboxylic acid having the formula of:

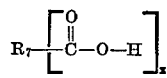

where $R_7$ is selected from the class consisting of an alkyl group having from 4 to 8 carbon atoms and an aryl group, and X is an integer of 2 or 3, said salt formed by the combination of said amine and said polycarboxylic acid in the mole ratio of X to 1, respectively, dissolving said salt in an inert volatile organic solvent, heating said alloy solder to a molten temperature, heating a portion of said metal surface to between 650° to 750° F., applying the solution of said salt in the organic solvent and said alloy solder to the heated portion of said metal surface, and cooling the connection formed to a temperature less than 650° F.

2. The method of claim 1 wherein said polycarboxylic acid is selected from the class consisting of sebacic, 2-ethylsuberic, 2,5-diethyladipic, terephthalic, isophthalic and trimellitic acids.

3. The method of claim 1 wherein said inert volatile organic solvent is selected from members of the class consisting of butyl acetate, ethylene glycol-monomethyl ether, ethylene glycol-monoethyl ether, ethylene glycol-monobutyl ether, nitropropane, isopropyl alcohol, benzene, toluene, xylene, methyl-ethyl-ketone, methyl-isobutyl-ketone and isophorone.

4. The method of making a connection between a high lead and low tin alloy solder and a solderable metal surface which comprises heating the alloy solder to a molten temperature, raising a portion of the solderable metal surface to between 650–750° F., applying a salt of a tertiary amine and a polycarboxylic acid, the tertiary amine having a formula of:

where $Y_1$ and $Y_2$ are selected from the class of a single hydrocarbon group (Y) and separate hydrocarbon groups; when a single group Y is cyclized with Z to form a 6-membered heterocyclic aromatic ring containing the trivalent nitrogen atom wherein Y and Z are hydrogen groups with Y having from 3 to 9 carbon atoms and Z having from 2 to 4 carbon atoms, and wherein groups pendant from the heterocyclic ring are alkyl radicals; and when $Y_1$ and $Y_2$ are separate, both are alkyl groups of from 1 to 6 carbon atoms wherein Z is selected from the class of an alkyl group of from 1 to 6 carbon atoms, and an aryl group of from 6 to 8 carbon atoms, and wherein when $Y_1$ and $Y_2$ are ethyl groups, they may be cyclized through an oxygen atom or a methylene group with Z being, respectively, an alkyl group of from 1 to 6 carbon atoms and an alkyl group of from 1 to 4 carbon atoms, and said polycarboxylic acid having the formula of:

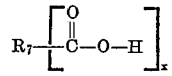

where $R_7$ is selected from the class consisting of an alkyl group having from 4 to 8 carbon atoms and an aryl group, and X is an integer of 2 or 3, said salt formed by the combination of said amine and said polycarboxylic acid in the mole ratio of X to 1, respectively, together with the alloy solder to the heated portion of the solderable metal surface, and thereafter cooling the connection formed to a temperature less than 650° F.

5. The method of making a connection between a high lead and low tin alloy solder and a solderable metal surface which comprises heating the alloy solder to a molten temperature, raising a portion of the metal surface to between 650 to 750° F., applying the salt of a tertiary amine and a polycarboxylic acid and the alloy solder to the heated portion of the metal surface, the tertiary amine of the salt having the formula of:

$$N : (R_3 R_2 R_1)$$

where $R_1$ and $R_2$ are alkyl groups having from 1 to 6 carbon atoms and $R_3$ is selected from the class consisting of an alkyl group having from 1 to 6 carbon atoms, an aryl group, and an alkyl substituted aryl group, and said polycarboxylic acid having the formula of:

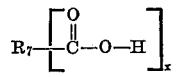

where $R_7$ is selected from the class consisting of an alkyl group having from 4 to 8 carbon atoms and an aryl group, and X is an integer of 2 or 3, said salt formed by the combination of said tertiary amine and said polycarboxylic acid in the mole ratio of X to 1, respectively, and thereafter cooling the connection formed to a temperature less than 650° F.

References Cited

UNITED STATES PATENTS

| | | | |
|---|---|---|---|
| 2,756,497 | 7/1956 | Gale | 29—495 |
| 3,264,146 | 8/1966 | Marks | 29—495 X |
| 3,305,406 | 2/1967 | Chmelik | 29—495 X |
| 3,344,001 | 9/1967 | Thompson | 29—495 X |
| 3,357,093 | 12/1967 | Webb | 29—495 |

CHARLIE T. MOON, Primary Examiner

R. J. SHORE, Assistant Examiner